United States Patent
Polston

(10) Patent No.: US 7,232,482 B2
(45) Date of Patent: *Jun. 19, 2007

(54) METHOD FOR MAKING A ROAD BASE MATERIAL USING TREATED OIL AND GAS WASTE MATERIAL

(76) Inventor: David L. Polston, 21349 Water Wood Dr., Garden Ridge, TX (US) 78266

( * ) Notice: Subject to any disclaimer, the term of this patent is extended or adjusted under 35 U.S.C. 154(b) by 0 days.

This patent is subject to a terminal disclaimer.

(21) Appl. No.: 10/481,671

(22) PCT Filed: Jun. 13, 2002

(86) PCT No.: PCT/US02/19004

§ 371 (c)(1),
(2), (4) Date: Dec. 19, 2003

(87) PCT Pub. No.: WO02/102927

PCT Pub. Date: Dec. 27, 2002

(65) Prior Publication Data

US 2004/0173772 A1    Sep. 9, 2004

Related U.S. Application Data

(60) Provisional application No. 60/299,225, filed on Jun. 19, 2001.

(51) Int. Cl.
*C04B 18/18* (2006.01)
*C04B 18/12* (2006.01)
*B09B 3/00* (2006.01)

(52) U.S. Cl. .................. 106/668; 106/669; 106/671; 106/697; 588/257

(58) Field of Classification Search ............ 106/668, 106/669, 671, 697, 719, 724, 802, 803, 277, 106/283, 281.1; 588/252, 257; 210/348
See application file for complete search history.

(56) References Cited

U.S. PATENT DOCUMENTS

| 2,107,406 | A | * | 2/1938 | Wood ................ 210/412 |
| 5,106,424 | A | | 4/1992 | Rez |
| 5,700,107 | A | | 12/1997 | Newton |
| 6,322,489 | B1 | | 11/2001 | Richardson et al. |
| 6,706,108 | B2 | | 3/2004 | Polston |
| 2003/0116887 | A1 | * | 6/2003 | Scott ................ 264/333 |

OTHER PUBLICATIONS

"Q & A Asphalt Stabilized Base & Soil Recycling Q & A" (no date provided), 2 pages.
Meador, Chip, TNRCC Analytical Report, (Nov. 29, 1999) pp. 1-38, Corpus Christi, Texas 78408.
Texas Natural Resource Conservation Commission Inspection Report, Step. 11, (1999), no month provided, pp. 1-7.
Undated presumed prior art, single page sheet describing a process used by "Osage" . no date provided.
San Antonio Construction News, (Mar. 2002) 2 pages including "New Technology Represents a Turning Point".
Special Specification 3157, (1993), no month provided, Specifications (5 pages).
Pages 11-23 of a document entitled: "Environmental and Engineering Test Procedures," (Updated, some pages missing), (No. p. 15, 19 or 20), no date provided.
4 pages of "Environmental Recycling" certificate forms (1999), no month provided.
1 page of Texas Natural Resource Conservation Commission "Non PST Waste Profile"; revised (Nov. 1, 1994).
Railroad Comm. of TX ltr. to Transcon Energy Corp. regarding permit for stationary treatment facility dated (Oct. 12, 2001), re: appl. dated Apr. 20, 1998.
"Recycling Center. . . Recyclable Materials" Div. of Solid and Hazardous Waste, Trenton, NJ. for Soil Safe, Inc., City of Salem, pp. 1-16, no date provided.
2 page ltr to Mr. Grant from Div. of Solid & Haz. Waste (certified mail), no date provided.
A selection of Internet Docs. printed out in early (2004), no month provided, total 17 pages.
24 pages of British Cement Assn. Publication 46.050 (2001), no month provided.
Railroad.Comm. of TX assorted ltr. to Osage Environmental re: permit for recycling, No. STF-011 (Jun. 2003).
14 pages of Railroad Comm. of TX. assorted ltrs, begins with Transcon Energy Corp. re: permit for stationary treatment facility No. STF-010, (2002).

* cited by examiner

*Primary Examiner*—David M. Brunsman
(74) *Attorney, Agent, or Firm*—Jackson Walker, LLP

(57) ABSTRACT

The present invention provides a novel method to produce grade road base material using recycled oilfield waste, called "oil and gas waste," and aggregate waste and a novel road base material. Hydration and mixing of the waste materials along with a binder, will achieve an irreversible pozzolanic chemical reaction necessary for stabilization into a road base. An asphalt emulsifier may be included in the binder to manufacture asphalt stabilized road base. The entire method is a cold batch process.

2 Claims, 9 Drawing Sheets

DRY MIXING

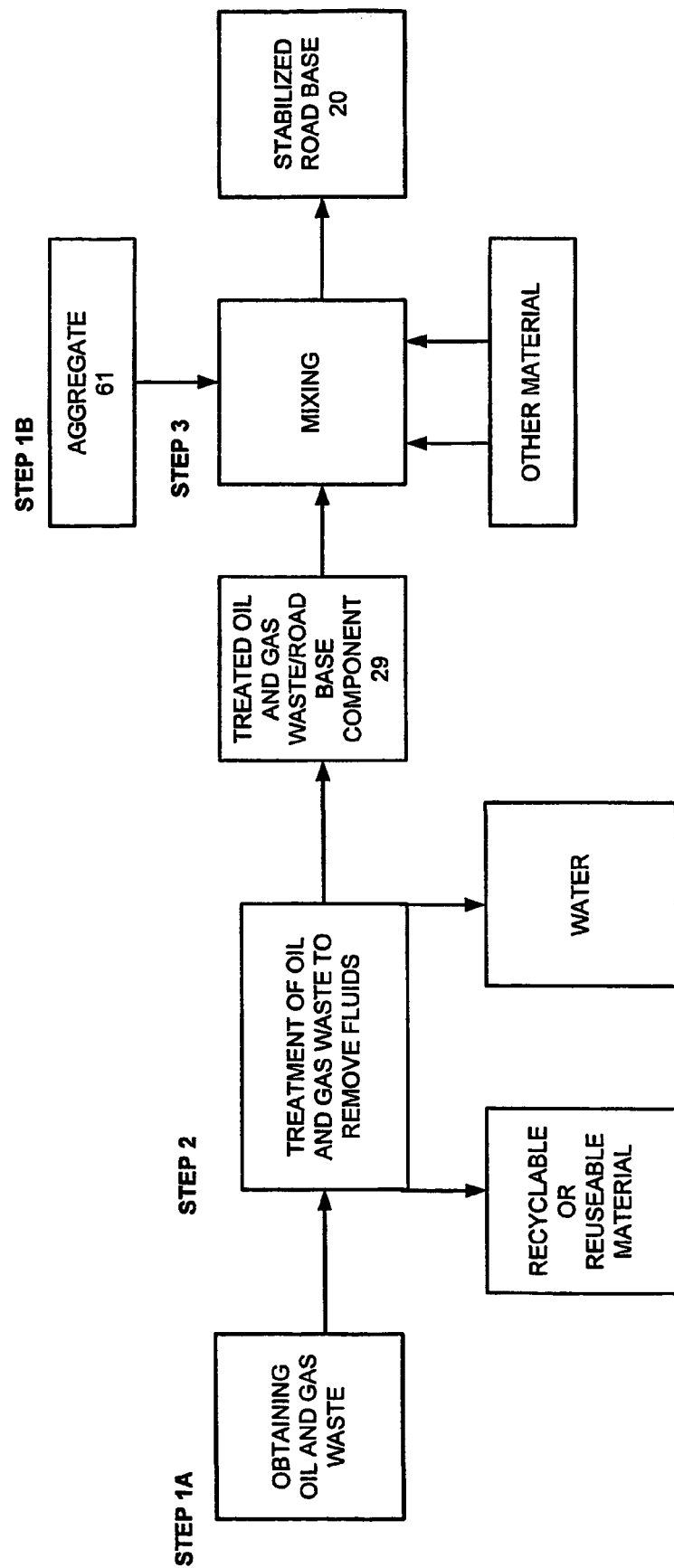

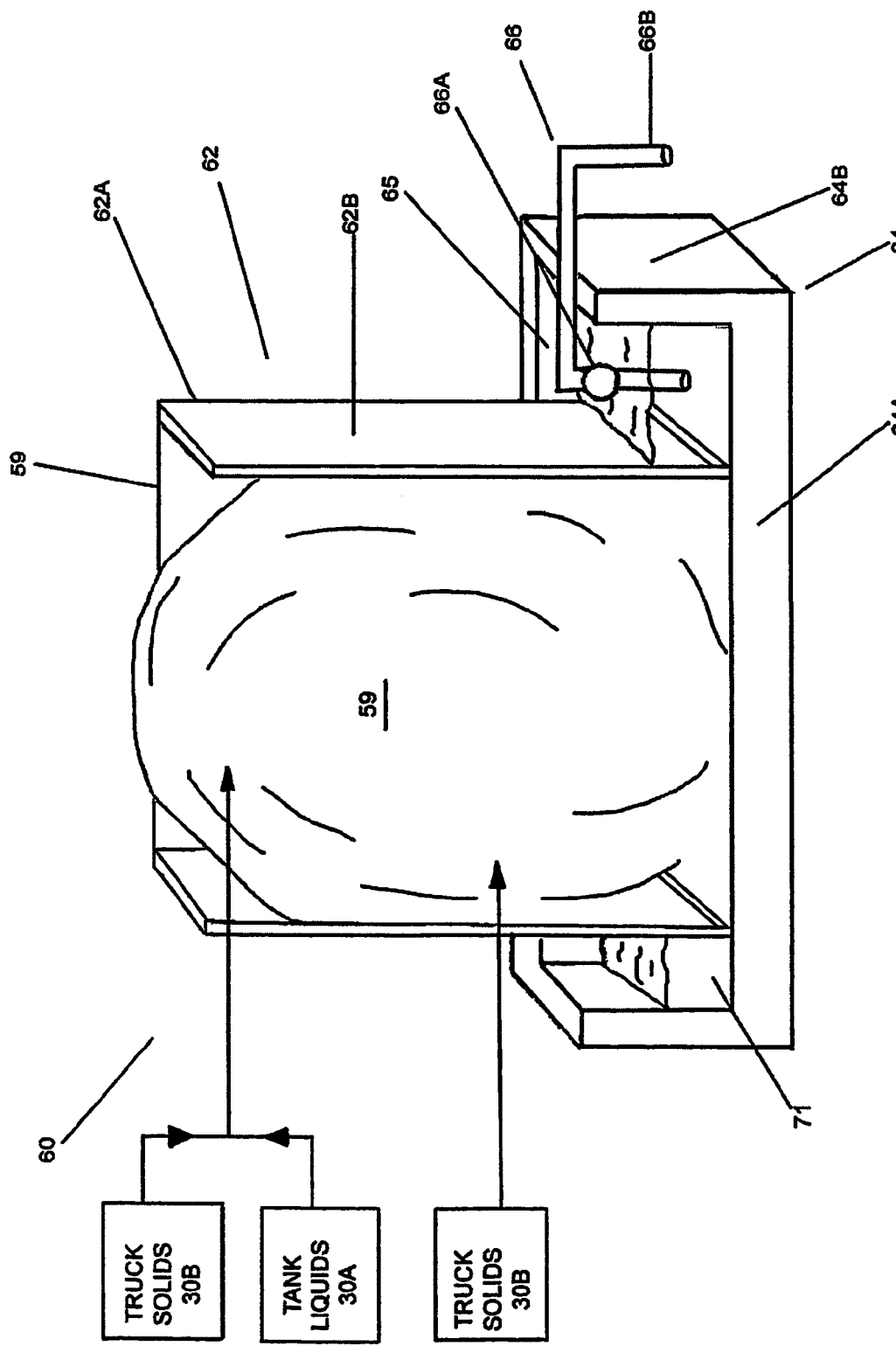
FIG. 2A Stacking

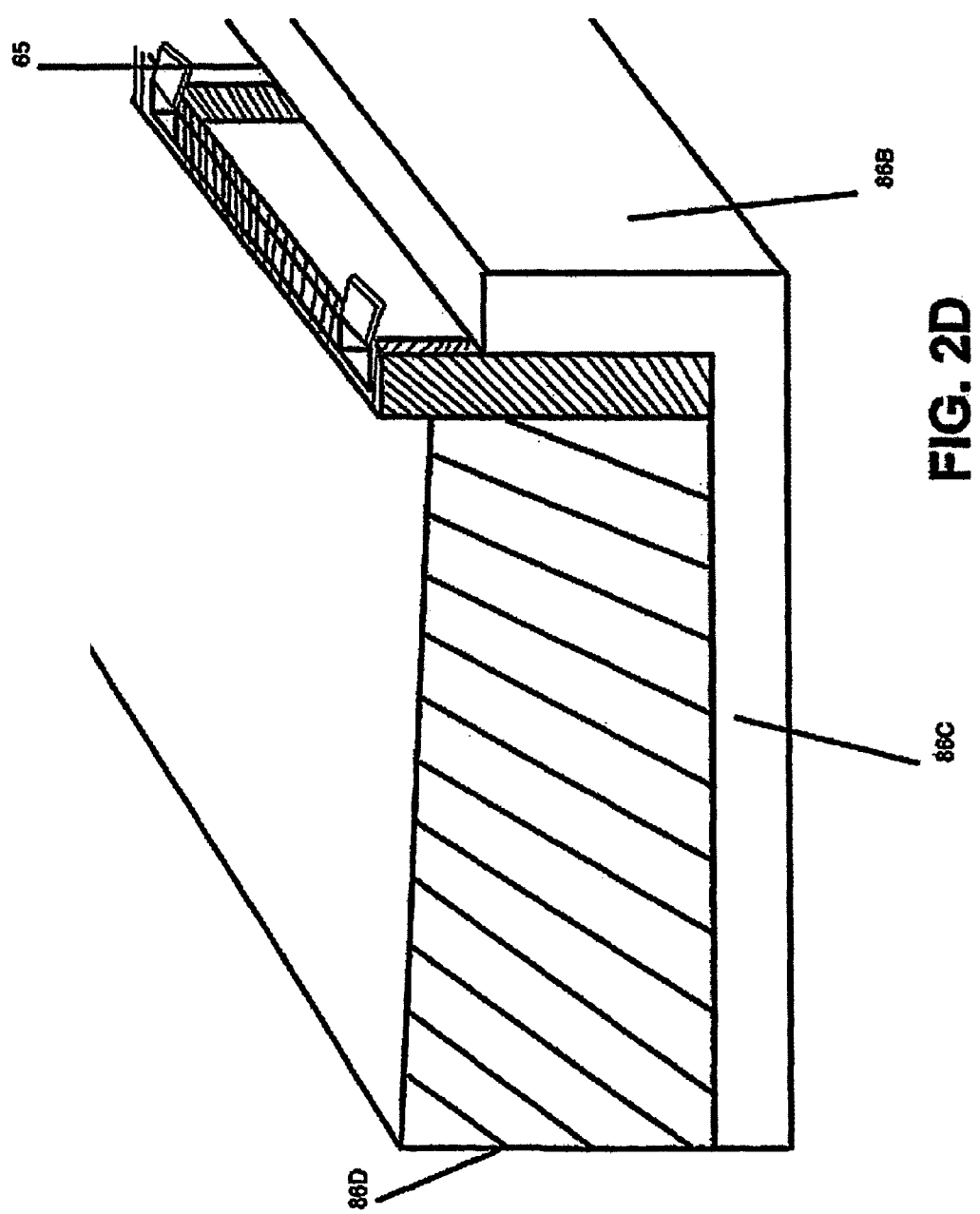

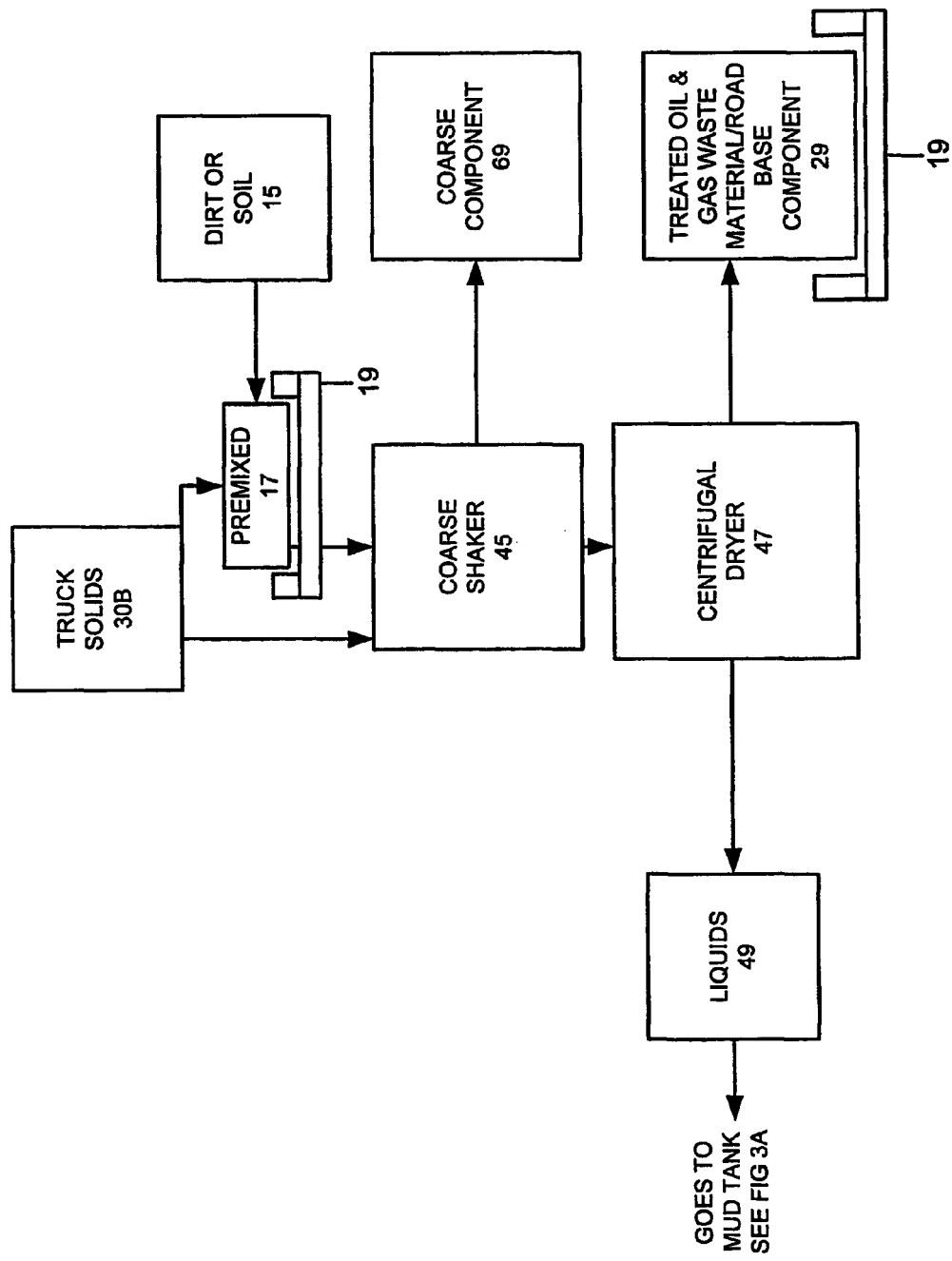
FIG. 3 MECHANICAL SEPARATION

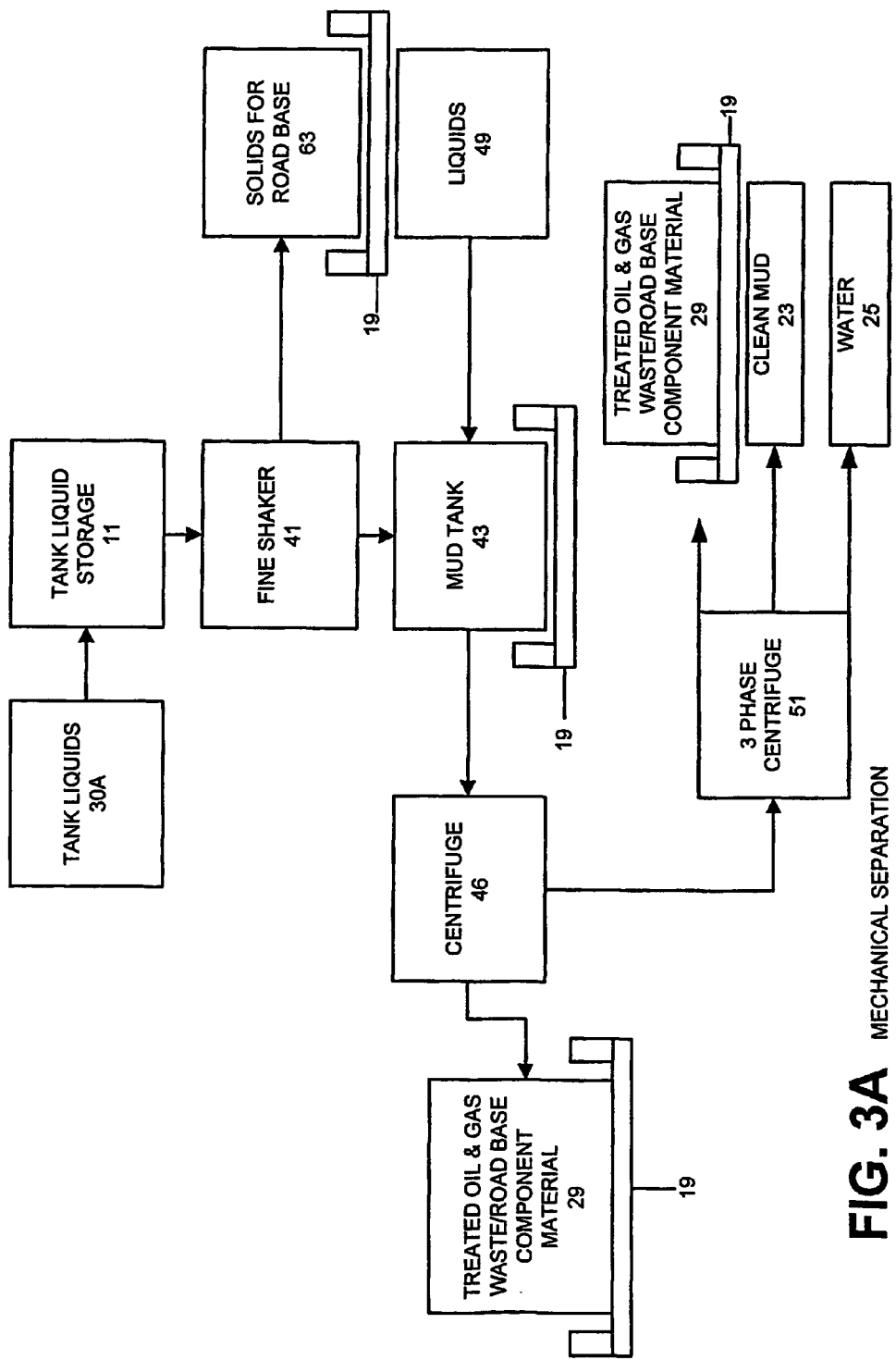
FIG. 3A MECHANICAL SEPARATION

METHOD FOR MAKING A ROAD BASE MATERIAL USING TREATED OIL AND GAS WASTE MATERIAL

This application is based on and claims priority from utility patent application Ser. No. 10/062,119, filed Jan. 31, 2002 which claims priority from provisional patent application is a 371 of PCT/US02/19004, filed 13 Jun. 2002, which Ser. No. 60/299,225, filed Jun. 19, 2001.

FIELD OF THE INVENTION

Applicants' invention relates to a method for making road base using primarily waste material from oil and gas waste solids and non-hazardous industrial waste or natural occurring porous or semi-porous material to create a asphalt stabilized road base that is environmentally safe and meets industry standards for quality materials. More particularly, it relates to isolating oil and gas waste from the environment, treating the isolated oil and gas waste and combining, isolated, treated oil and gas waste material with aggregate to provide the major components for the roadbed base material.

BACKGROUND INFORMATION

Because of their importance in all aspects of both business and private life, the construction of roads has historically been of prime importance to a society. That importance remains today. However, it has also become more apparent in recent years that most resources are not infinite but rather, are depletable. Additionally, disposing of waste materials is becoming harder and harder due both to space limitations and liability resulting from waste materials entering the environment.

Thus, there is a need for developing methods and devices to recycle waste products into new, usable products. If the components of roadbeds can be obtained from the waste products of other products and processes, then both waste product production is decreased and new product consumption is decreased. Further, it is advantageous to recycle waste products due to the economic advantage of using recycling materials and thus compounding return on the original costs of the products.

While oil and gas waste material has been a component of roadbed material there has in the prior art not existed a method, or structures for practicing the method of combining oil and gas waste product into a road bed in a manner such that the oil and gas waste material is isolated, at each step of it's acquisition, transportation, delivery, storage, treatment and mixing at a remote production plant so as not to contaminate the environment. "On the ground mixing" of oil and gas waste material to make a road base may be environmentally harmful. Applicant's use of a man made impervious layer "MMIL" and other devices and methods, in order to isolate both the oil and gas waste material, and any harmful bi-products thereof, during a process of producing a roadbed, at a plant or site designed for such novel processes and devices will yield benefits in a clean environment and also benefits and recovery of harmless compositions in the treatment process which may be further treated in such a manner as to either become benign and/or be recycled.

Moreover, Applicant's providing of a managed, isolated site and treatment process may yield more efficiency then a "on the ground process." Applicant's processes and devices for such processes used at a remote site would typically use less equipment then "on the ground mixing." Further, Applicant's novel method of stacking and of mechanical separation of the proportion of liquids from a portion of solids of oil and gas yields benefit in both isolating harmful oil and gas waste material from the environment but allows the recycling of liquid portions of the oil and gas waste material apart from the oil and gas material as a whole. Applicant provides a cement slab operation, for example, the stacking oil and gas material to generate gravity induced separation. On the ground operation requires spreading to dry the material-by absorption with the ground material. Applicant's methods are believed to environmentally sound and yield treatment of liquid portions for, for example recycling.

SUMMARY OF THE INVENTION

The primary focus of the invention is the acquisition, transportation, storage and treatment of oil and gas waste as isolated from the environment at an environmentally safe facility, for use with other materials to make a suitable road base material. Treatment of isolated oil and gas waste is done to remove at least a portion of a liquid component, typically primarily oil and water to yield a treated oil and gas waste portion which is then combined, still isolated, with an aggregate and a binder and stabilizer to produce a suitable road base material. The treatment of the isolated oil and gas waste, while yielding a liquid portion may also yield other recyclable or useable products such as clean mud. Clean mud is a product often desired by oil and gas well drillers. Thus, it is the desired result of the present invention of using oil and gas waste material treated in isolation, such that it is converted into a material that is useable and, excepting perhaps "waste water" which may be reinjected, yields environmentally friendly, economically valuable components.

Turning to the separation of the liquid component from the oil and gas waste material it is anticipated by the present invention that there are a number of methods of liquid portion removal. Each such method will allow separation without contaminating the environment. One such method is a novel means of stacking of oil and gas waste in an impervious container, to yield gravity induced separation of some of the liquid portion from the solid portion. Another method is mechanical separation, such as by a centrifuge. A third method is mixing with a dry material, such, for example, as soil, overburden, or caliche limestone, on a man-made impervious layer ("MMIL").

Such methods of treatment in isolation not only help keep the environment clean, but may yield, with further treatment, valuable material.

The present invention provides a novel method to produce road base material using waste products from one or both of two industries: oil and gas well drilling and from construction and/or demolition and manufacturing projects. The present invention also provides for a novel road base composition. The oilfield waste is typically comprised of hazardous and/or non-hazardous oilfield solid or liquid waste such as water based drilling fluid, drill cuttings, and waste material from produced water collecting pits, produced formation sand, oil based drilling mud and associated drill cuttings, soil impacted by crude oil, dehydrated drilling mud, waste oil, spill sites and other like waste materials tank bottoms, pipeline sediment and spillsite waste. Oilfield waste may include waste or recycled motor oil, petroleum based hazardous or non-hazardous materials, such oilfield waste materials are collectively referred to as "oil and gas waste material." They typically have a solid component and a liquid component, the liquid component including quantities of oil and water. The solid components may be, in part, particulate, or cuttings.

An aggregate component of the road based material may include a non-hazardous industrial waste as defined in more detail below or any natural occurring stone aggregate such as limestone, rip rap, caliche, sand, overburden, or any other naturally occurring porous material. There may or may not be preparation of the aggregate material prior to combining with the treated oil and gas material to form the primary component of the road based material of Applicant's present invention.

The construction and/or demolition or manufacturing waste component of the aggregate material is typically comprised of non-hazardous industrial waste such as waste concrete, waste cement, waste brick material, gravel, sand, and other like materials obtained as waste from industrial construction, demolition sites, and/or manufacturing sites. Such materials are collectively referred to as "non-hazardous industrial waste."

One application of the method of the present invention provides for recycling the oil and gas waste material and the non-hazardous industrial waste to combine to produce road base. Another application of the present invention provides for recycling the oil and gas waste material and an aggregate including limestone, rip rap, caliche, or any naturally occurring porous or semi-porous material to combine to produce road base. Hydration and mixing of the isolated, treated oil and gas waste material and aggregate along with a binder such as cement, fly ash, lime, kiln dust or the like, will achieve an irreversible pozzolanic chemical reaction necessary for a road base. An asphalt emulsifier may be included in the binder to manufacture asphalt stabilized road base. The ingredients are typically mixed in a cold batch process.

Solid waste from the oil and gas waste material typically contains naturally occurring aluminas and silicas found in soils and clays. The added pozzolan will typically contain either silica or calcium ions necessary to create calcium-silica-hydrates and calcium-aluminate-hydrates. A pozzolan is defined as a finally divided siliceous or aluminous material which, in the presence of water and calcium hydroxide will form a cemented product. The cemented products are calcium-silicate-hydrates and calcium-aluminate-hydrates. These are essentially the same hydrates that form during the hydration of Portland Cement. Clay is a pozzolan as it is a source of silica and alumina for the pozzolanic reaction. The aggregate including natural stone aggregate or non-hazardous industrial waste adds structure strength and bulk to the final mix.

The process of creating a stabilized road base using an aggregate including non-hazardous industrial waste and oil and gas waste material may incorporate a water based chemical agent such as waste cement, varying amounts of aggregate and waste to produce a cold mix, stabilized road base product. An aggregate crusher may process the inert material (typically aggregate including the non-hazardous industrial waste or natural stone aggregate), into the size and texture required (from, for example ½" to 4"). The aggregate is added to the treated oil and gas waste material at a desired ratio in a manner that prevents contamination of the environment. It has been found that an approximate ratio of one-to-one treated oil and gas waste material to aggregate provides a good mix. This could vary depending upon the degree of contamination or the quality of the oil and gas waste. A chemical reagent may be added to congeal the mixture. An asphalt emulsifier is added to create an asphalt stabilized road base. The resulting product is a stabilized road base that not only is of a superior grade, but will not leach hydrocarbons, chlorides or RCRA metals in excess of constituent standards set forth in the Clean Water Act.

In order to further the environmental objectives of the present invention, it is desirable to isolate the oil and gas waste material from the site and at the site from the environment prior to during and after mixing. Thus, while the aggregate may be stored on the ground, oil and gas waste material should be received, transferred and stored surrounded by a berm and/or placed on a cement pad, or otherwise isolated by a physical barrier that will prevent leaching of liquid contaminates into the soil. This also prevents storm water runoff. The manufactured road base typically is mixed, processed, and likewise stored surrounded by an earthen berm and on a cement pad and/or other physical barrier that will prevent leaching of liquid contaminates into the soil. Thus, the present invention provides a novel method that will produce an environmentally safe grade road base material.

Among the objectives of the present invention are to:

a. provide isolation of environmentally harmful oil and gas waste from acquisition through to treatment of and conversion to environmentally safe products;

b. combine treated oil and gas waste material with aggregate to produce a stabilized road bed composition;

c. reduce waste from oil drilling, and construction/demolition and manufacturing;

d. reduce the use of new materials for roadbeds;

e. provide a method for producing roadbed material at a lower cost than conventional methods;

f. provide methods and devices for treating oil and gas waste material isolated from the environment, to yield a material that can be used for preparing a stabilized roadbed and also yield clean mud and water;

g. combine treated oil and gas waste material with non-hazardous industrial waste or naturally occurring material to yield an environmentally safe, usable, stabilized road bed composition;

h. provide simple methods and devices of removing a liquid component from oil and gas waste material while the oil and gas waste and the resulting components remain isolated from the environment;

i. recycle aggregate waste from construction, demolition and manufacturing sites; and j. provide for a single site or location to which oil and gas waste is transported, stored and at which it is treated and mixed, in isolation from the environment, to form a road base composition.

BRIEF DESCRIPTION OF THE DRAWINGS

FIG. 1A is a generalized view of a process of applicants present invention.

FIGS. 2A–2D illustrates applicants novel method and device for isolating stacking oil and gas waste material.

FIGS. 3 and 3A represent preferred alternate embodiments of a process of treating the oil and gas waste material in isolations to prepare it for combination with the aggregate waste material.

DETAILED DESCRIPTION OF THE PREFERRED EMBODIMENT

FIG. 1A illustrates an overview of the steps of Applicant's present invention. Applicant provides for, in obtaining step 1A, obtaining oil and gas waste from an oil and gas waste site as set forth in more detail below and transferring the waste to a treatment and mixing site. The second step, the obtaining step 1B, is that of obtaining an aggregate, typically inert, from a natural source such as limestone rock, caliche, rip rap, sand, dirt or the like or, as waste material from a construction, manufacturing, or demolition site. Step 2 is the treatment of oil and gas waste to remove fluids and obtain water and recyclable material, which water and material may be further processed. The third step is some form of mixing (as described in more detail below) wherein treated oil and gas waste is combined with aggregate and other material while in isolation from the environment to provide an environmentally safe roadbed.

Turning back to the oil and gas waste, it is typically transported to the treatment site where applicant's novel treatment provides several methods of removing at least some of the fluids, from the oil and gas waste material to provide a treated oil and gas waste material road base component which then is mixed with the aggregate to form a road base. As is apparent from FIG. 1A, the treatment step, step 2 removes water and also provides for recyclable or reusable material, such as clean mud and oil in step 2A. Further, it is seen that step 3, a step of mixing, may include not only the mixing of the aggregate with the treated oil and gas waste, but also mixing in other material such as binder, emulsion, etc., as set forth in more detail below. The result of the novel process is to provide a novel road base composition which is made up of treated oil and gas waste material and an aggregate and to apply such composition to a road base location.

Figure 1:
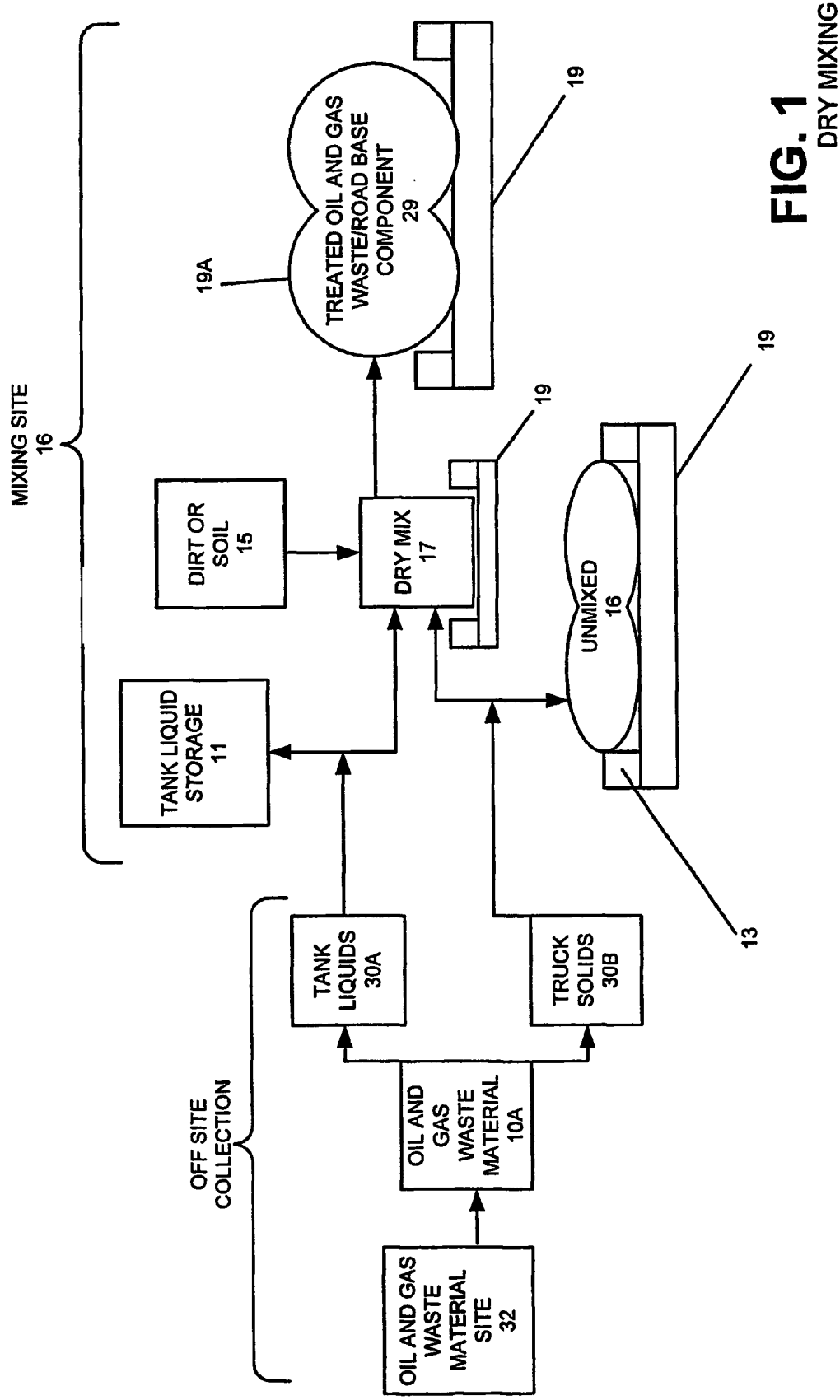
FIG. 1 is an overview of a process of storage and treatment by dry mixing the oil and gas waste material.

Turning to FIG. 1, it is seen that, what is received from the oilfield site (32) at mixing site (16) is either tank liquids (30A) or truck solids (30B) sometimes called "cuttings". We will call these materials collectively oil and gas waste material (10A). Upon arrival at mixing site (16), tank liquids (30A) may be deposited into a leak proof liquid storage tank (11). Truck solids (30B), which have a more solid like consistency than the tank liquids (30A), may be deposited on an impervious layer (19) and contained, typically, in an impervious earthen storage berm (13). FIG. 1 shows that tank liquids (30A) and truck solids (30B), collectively referred to as oil and gas waste material (10A) is obtained from an oilfield site (32) including but not limited to drilling sites, pit clean-up sites, spill clean-up sites, blow-out sites and oil and gas exploration, pipelines and refining industry or production sites. Typically the oil and gas waste material (10A) will be either "liquids" transported away from the oilfield site (32) in vacuum trucks or waste of a more "solid" or "slurry" consistency and transported in dump trucks. In both cases the transportation keeps the oil and gas waste separated from the environment and the trucks deposit their loads in means to isolate the material from the ground at the site. The oil and gas waste material (10A) is transported from the oilfield site (32) to a mixing site (16) by a first transport such as by a vacuum truck for liquids ("tank liquids") (30A) or a second transport such as a dump truck for the "slurries" ("truck solids") 30B.

FIG. 1 illustrates the dry mixing method of treatment; truck solids (30B) may be combined with soil (15) or other dry, absorptive indigenous material to help dry them and then stored on an impervious layer (19) as dried truck solids (17) in a storage pile (19A) on an impervious layer (19). The mixing and storage is typically done on an impervious layer. The impervious layers disclosed herein may be man-made, as from concrete, plastic, steel, the road base material described herein or the like. Indeed, all of the storage and treatment of the oil and gas waste material (10A) may take place in an enlarged enclosure the bottom of which has an impervious layer (19) and optionally, sides of which include a storage beam (13) made of either concrete or same other suitable material.

The next step in handling the oil and gas waste material (10A) is to treat it to at least remove some of the liquids therefrom (typically oil and water) so as to prepare a treated oil and gas waste/road base component material (29) for mixing in the pug mill (18) to produce road base (20). Applicant provides a number of processes to treat the oil and gas waste material (10A). These processes include "dry mixing" as illustrated in FIG. 1, "stacking" as illustrated in FIG. 2B and "mechanical separation" as illustrated in FIGS. 3 and 3A. FIG. 1 illustrates a treatment of oil and gas waste material 10A.

Turning to FIGS. 2A–2D, Applicant's treatment by stacking is illustrated. In this preferred embodiment of treatment of oil and gas waste by way of a draining/evaporation process, the draining induced by gravity and the weight of the waste material itself is used along with a unique apparatus including a drainage assembly (60) to help remove oil and other liquids from either the truck solids (30B) or a mixture of truck solids (30B) and tank liquids (30A). It is pointed out here that it is preferable that the oil and gas waste material (10A) be treated to remove some of the liquids as it then makes the mixing of the road bed composition more effective. Typically, when the treated oil and gas waste material (10A) is paint filter dry or thereabout, it is sufficiently dry or damp to be processed in the pug mill. Moreover, it is not necessary for all the fluids to be removed from the oil and gas waste material (10A) which may in fact, be somewhat damp after treatment.

Turning back to FIG. 2A it is seen that the stacking step (28A) includes a step of providing a drainage assembly (60) which includes a screened enclosure (62) typically three-sided and contained within the an impervious enclosure (64). More specifically, drainage assembly (60) is designed to contain within impervious enclosure (64) the screen enclosure (62) which is usually constructed from rigid frame member (62A) consisting of angle iron welded or bolted together, which frame members secure screened walls (62B), which screened walls may be made from a suitable screening material or expanded metal, with holes, typically in the range of sixty mesh to ¼ inch. The screened enclosure (62) is located in an impervious enclosure (64), which impervious enclosure includes a bottom wall (64A) and a side wall portion (64B). It is seen that the dimensions of the screen enclosure (62) are such that there is a gap created between screened wall (62B) and side wall (64B) of the impervious enclosure (64). It is in the gap (65) created by the dimensions of the screened enclosure (62) and impervious enclosure (64) respectively, that drainings (71), that is liquids comprising typically oil or some water, collect. Within screened enclosure (62) and typically piled such that its vertical height exceeds the length or width of the screened enclosure (62) is stacked oil and gas waste (59) which is comprised of either truck solids (30B) or a combination of truck solids (30B) and tank liquids (30A). Stacking the stacked oil and gas waste (59) in a manner so that is has a substantial vertical dimension (height) helps to ensure that there is sufficient weight to squeeze out drainings (71), which may be then evacuated either continuously or periodically from gap (65) through the use of a pumping or vacuum system (66). The pumping system includes pump (66A) and an engaging tube or hose (66B) or a vacuum hose attached to a vacuum truck (not shown). Tube or hose (66B) has a first end for immersion in the drainings (71) and a removed end outside impervious enclosure for transporting drainings to a desired site for isolation into the mud tank for further processing. Pump (66A) may be electric or hydraulic or any other suitable means and may be float controlled for it to be activated when draining (71) reaches sufficient depth within impervious enclosure (64).

An alternate preferred embodiment of Applicant's drainage assembly (60) there may be troughs or grooves (65) provided in the bottom wall (64A) of impervious enclosure (64) to assist in the draining of the stacked oil and gas waste (59) (See FIG. 2B).

The drainage assembly (60) may be any size, but is preferably designed to contain from 1 yard to 300,000 yards of stacked oil and gas waste (59) which may be dumped into the screened enclosure (62) using a front end loader or by dump truck or vacuum truck. They may be left to allow for the draining anywhere from a day to ten days or longer depending upon how saturated they are at the beginning of the treatment process. They are then removed from the screened enclosure (62) by any suitable method such as an excavator, to insure that they remain isolated from the ground and are then typically ready for transport to the crusher or the pug mill for mixing.

Figure 2:
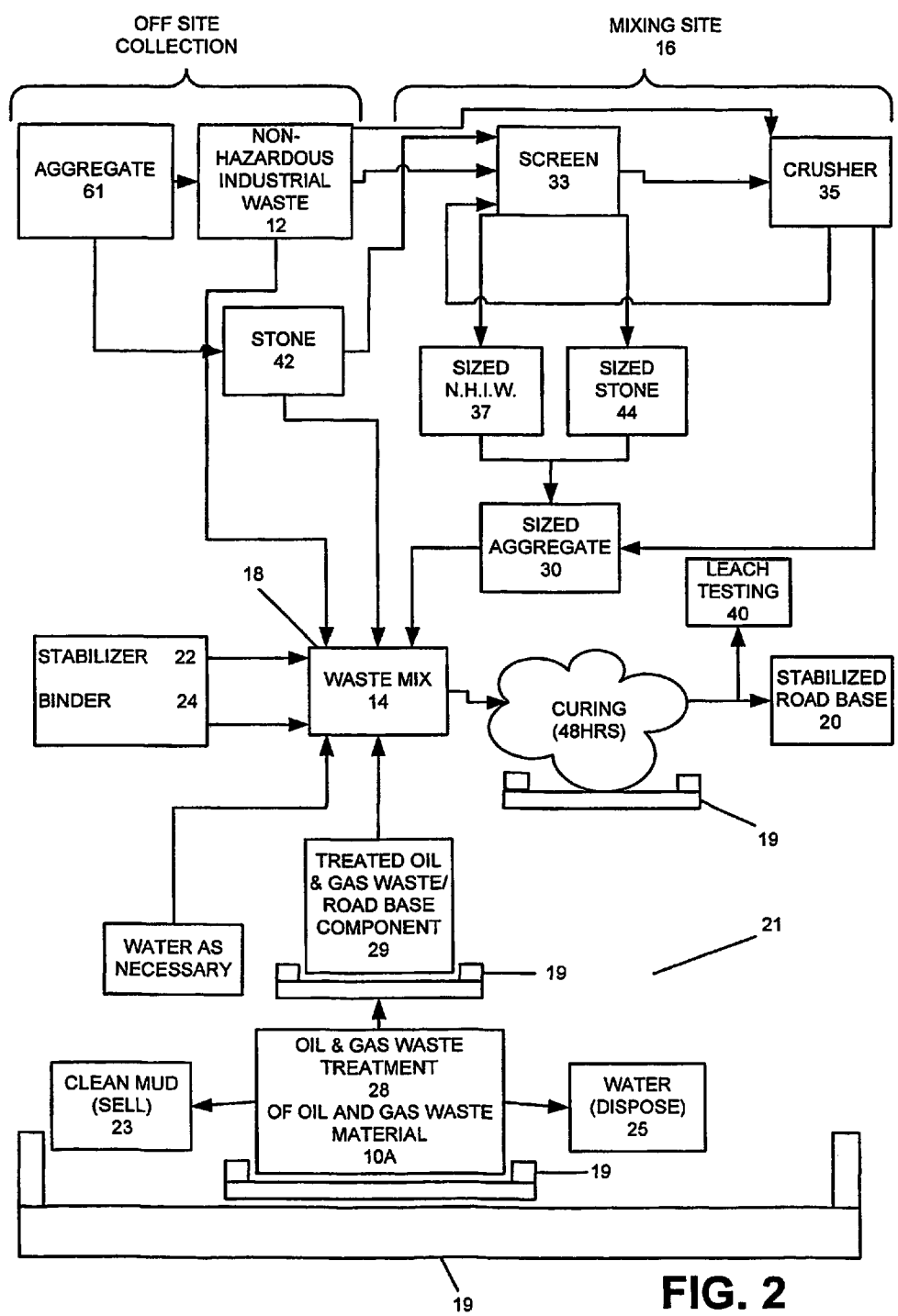
FIG. 2 is a flow chart illustrating an overview of a process of combining treated oil and gas waste material and aggregate to produce, typically in a pug mill, waste mix 14, which cures to form a novel road base.
Figure 2B:
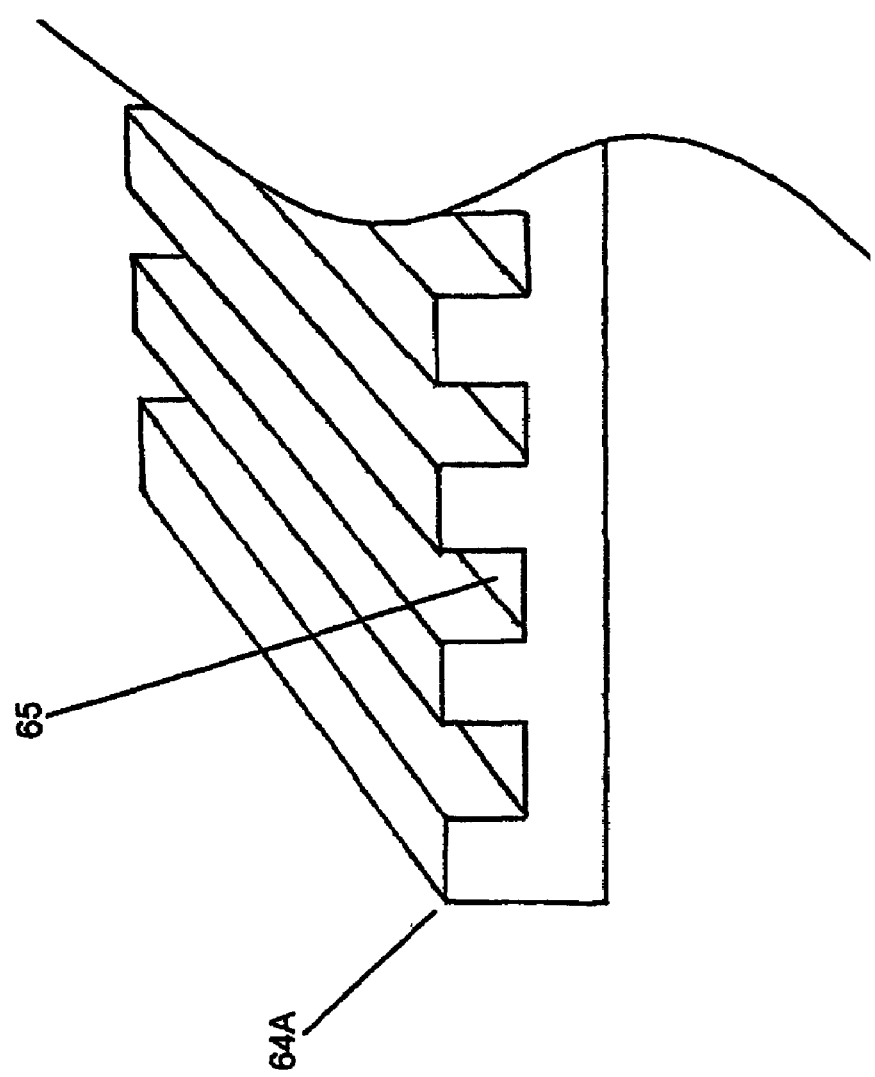
Figure 2C:
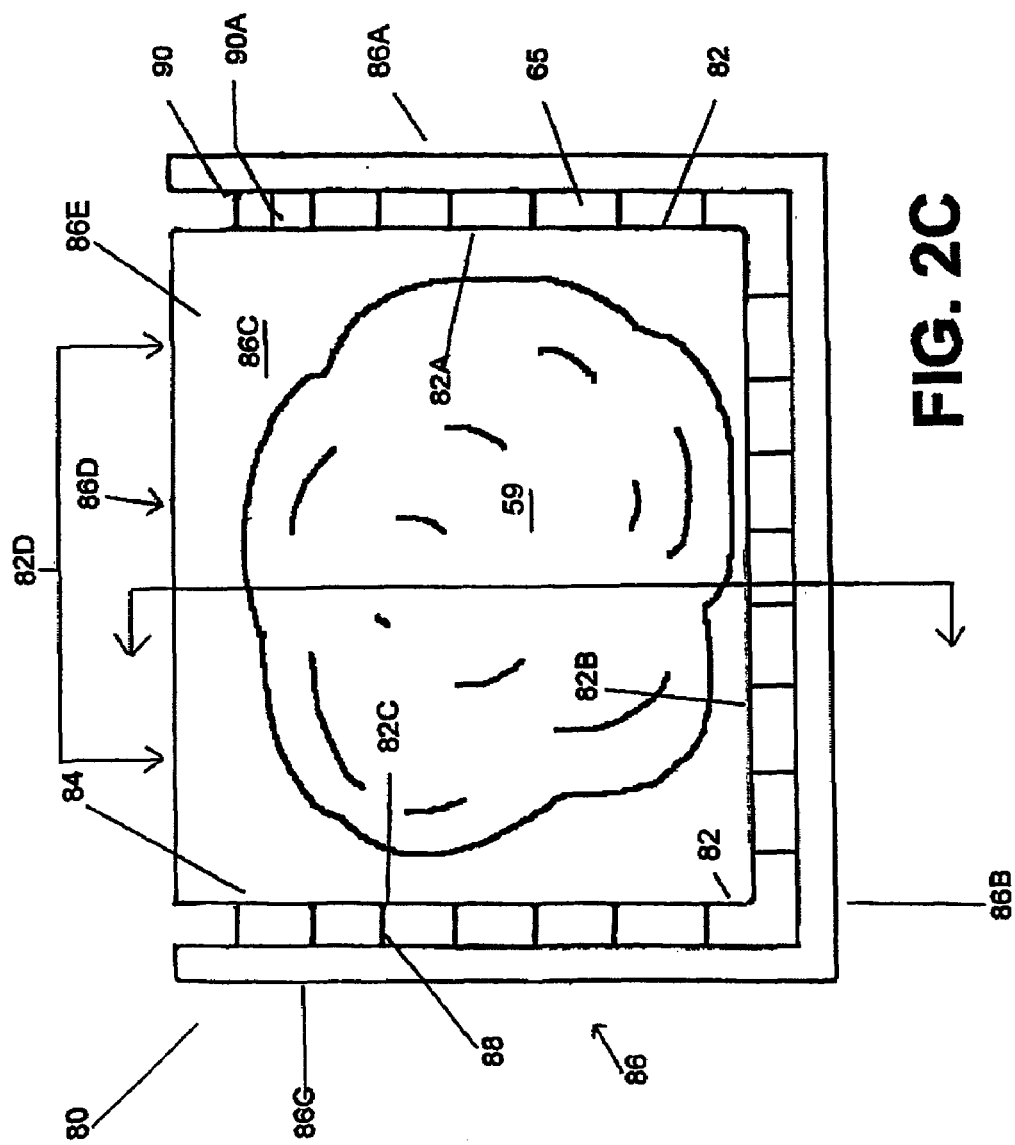

FIGS. 2C and 2D represent a top elevation and a cutaway side view of an alternate preferred embodiment of Applicant's drainage assembly (80). This embodiment differs from the embodiment illustrated in FIGS. 2A and 2B in several respects. First, the stacked oil and gas waste (59) is enclosed in a three-sided or walled mesh enclosure (82). That is, drainage assembly (80) includes a three-walled mesh enclosure (82) that consists of a side wall (82A), a back wall (82B) and a second side wall (82C), opposite side wall (82A). The three-walled mesh enclosure has an open front (82D). The mesh enclosure (82) lies within concrete retainer shell (86) or impervious layer and slightly spaced apart therefor to create a gap (65). Retainer shell (86), typically made from concrete and about three feet high, has typically three walls: side wall (86A), back wall (86B), second side wall (86C), the second side wall being opposite the first side wall. The retainer shell has an open front (86D) to allow dump trucks to back in and dump their load of oil and gas waste. A floor (86E), typically concrete, is provided.

The retainer shell is typically about 100 feet by 100 feet with the back and two side walls about three feet high. Further, the floor is typically slanted a few degrees from horizontal dipping towards the back wall to allow liquids to drain to the back rather than out the open front.

Mesh or screen sections (84) typically come in 4-foot by 8-foot sections and can be laid lengthwise inside the side and back walls of the impervious enclosure spaced apart therefrom by the use of steel braces (88) set vertically on the floor and typically having a length of about four feet (representing the height of the 4'×8' sections) which lay on the concrete floor. The braces will prevent the mesh or screen (84) from collapsing from the weight of the oil and gas waste material stacked against them and the braces provide for a gap (65), usually about six inches or so, from which a pump or vacuum system and related plumbing may be provided to remove liquids accumulating therein. It is seen that across the top of the beams joining a top perimeter of the wire or mesh section may be a closed top (90) typically with an access door (90A). The function of the closed top is to prevent any oil and gas waste material stacked too high from falling over the top perimeter of the mesh section into the gap between the mesh section and the concrete wall. The access door may be opened to periodically insert a hose or pipe to evacuate accumulated liquids from gap (65). It is noted with reference to FIG. 2D that mesh typically stands a bit higher than the top of the three walls of the retainer shell. The space between the top of the impervious layer and the closed top (90) may be left open or closed with a suitable member. Closing that area would of coarse prevent accidental spillage of material into gap (65).

The material that accumulates in the gap is typically oil with some water and may be sent via pipe or truck, to the mud tank or used to add to clean mud. It further may be separated, having an oil component and a water component with the water component disposed of, and the oil component used to add to the clean mud.

As is illustrated in FIG. 2, the oil and gas waste treatment (28) may also treat the oil and gas waste (10A) to remove a clean mud component (23), and a water component (25), yielding treated oil and gas waste/road base component material (29). Such treated oil and gas waste/road base component material (29) may then be combined with stone (42), "sized" stone (44), non-hazardous industrial waste (12), or "sized" non-hazardous industrial waste (37) or a combination of the preceding. These may be combined directly with the treated oil and gas waste/road base component material (29) in a pug mill (18) or other suitable mixer or may be combined on an impervious pad to form a pre-mix (31), which is then deposited into a pug mill (18) for further combining the two components together and for adding other components, such as portland cement (22) and a binder such as asphalt emulsion (24) to yield, upon curing, the stabilized road base (20) (water may be added as necessary).

The second of the two primary components of the stabilized road base (20) is an aggregate component (61) which is collectively either stone (42) (naturally occurring) and/or non-hazardous industrial waste (12). This non-hazardous industrial waste (12) typically consists of inert aggregate material, like broken up brick or cinderblock, broken stone, concrete, cement, building blocks, road way, and the non-metallic and non-organic waste from construction and demolitions site.

Non-hazardous waste (12) can be obtained from many sources and have many compositions. It includes waste brick materials from manufacturers, waste cement or other aggregate solid debris of other aggregate from construction sites, and used cement and, cement and brick from building or highway demolition sites.

Aggregate sites (34) include construction sites, building and highway demolition sites and brick and cement block manufacturing plants quarries, sand, dirt, or overburden or caliche pits. The aggregate is transported by dump trucks or the like to mixing site (16) where it may be separated down to a smaller size, that is, into aggregate particles typically less than 1½" in diameter by running them through a screen (33). Any material that is left on top of the screen may go to a crusher (35). That material may go back to the screen (33) until, falling through the bottom of the screen and measuring less than about 1½" in size. This will result in what is referred to as "sized" aggregate (30). This sized aggregate (30) is the aggregate component of the stabilized road base (20). It may then be combined with the treated oil and gas waste/road base component material (29) in a pre-mix (31) as by using backhoes or loaders to scoop treated oil and gas waste/road base component material (29) to physically mix with sized aggregate (30) (or unsized aggregate) to create a pile or batch of pre-mix (31), which then can be added to the pug mill (18). Optionally, this premix (31), if it has sufficient dampness from residual oil and moisture, may be combined with sufficient portland cement (22) to coat the particles, before putting it into the pug mill (18). As set forth above, treated oil and gas waste/road base component material (29) may be deposited directly into the pug mill (18) and sized aggregate (30) can be separately dumped into the pug mill (18) and the material mixed directly without a pre-mix (31). Note that portland cement (22) and asphalt emulsion (24) may also be added to the pug mill (18) while the two primary components, treated oil and gas waste/road base component material (29) and aggregate are being mixed. Typically, the treated oil and gas waste/road base component material (29) and aggregate (30) are mixed in a ratio of about 50/50, but may be between 20/80 and 80/20. After the material is thoroughly mixed in the pug mill (18), it is deposited on the ground and may be contained by an impervious berm (13) on a impervious layer (19) for curing (typically for about 48 hours). At this point, leach testing (40) can also be performed to determine whether or not the ratios of any of the materials need to be adjusted. Leach testing is usually done at a lab to ensure that materials from the road base do not leach into the ground.

The oil and gas waste material (10A) is comprised of hazardous and non-hazardous hydrocarbon based discarded material by oil and gas exploration production, transportation, and refining industries. Oil and gas waste material may include water base drilling fluid, drill cuttings, waste material from produced water collecting pits, produced formation sand, oil based drilling mud and associated drill cuttings, soil impacted by crude oil, dehydrated drilling mud, oil, pipelines and refining industries and like waste materials. It may be "dried" while isolated from the ground, by one or more of the novel drying processes disclosed herein. The term oil and gas waste material as used herein is not intended to be limited by definitions found in various codes or statutes.

Typically the oil and gas waste material (10A) contains enough liquids such that the aggregate (61) will likely become saturated if a mix is prepared without removal of some liquids. Therefore, the oil and gas waste treatment (28) of the tank liquids (30A) or truck solids (30B) is usually required. Oil and gas waste treatment (28) may also be used when clean mud is desired, since clean mud is often readily saleable. The oil and gas waste treatment (28) results in the production of clean oil and gas waste/road base component material (29) from the oil and gas waste material (10A).

The term "dry" is relative and means less liquid than before oil and gas waste treatment (28), typically, resulting in the loss of sufficient liquid such that mixing with the aggregate (61) will not result in saturation of the combination. If an oil and gas waste treatment (28) is used, then the treated oil and gas waste/road base component material (29) are mixed with the aggregate (61) and portland cement (22) and emulsion (24) in a ratio that results in a stabilized product. That ratio is determined by testing leachability of the roadbase for Benzene and RCRA metals; also for strength by testing for compressive strength and vheem stability, pH and chlorides. The ratio may be between 20/80 and 80/20, typically about 50/50. Whether oil and gas waste material (10A) is mixed with aggregate (61) directly in a dry mix (17), or if oil and gas waste (10A) is subjected to oil and gas waste mechanical or stacking treatment and treated oil and gas waste/road base component material (29) are mixed with aggregate (61), an oil/aggregate mix (14) results from by the combination.

Typically, aggregate (61) is optimally sized to ¾/inch to 1½ inch diameter pieces but may include a substantial portion smaller than ¾". Therefore, a determination of desired size is made and, if the aggregate waste is in pieces that are determined to be too large, they may be crushed in a crushing process (35) such as by a jaw crusher, to obtain the desired size prior to being added to the treated oil and gas waste/road base component material (29).

It has been found that a pug mill (18) provides adequate characteristics for proper mixing. The characteristics of a good mixer are consistency, coatability and durability. An emulsion (24) is added to the oil/aggregate waste mix (14) in the pug mill (18). The emulsion (24) serves to hold or bind the treated oil and gas waste/road base component material (29) to the aggregate waste (12) when the components are mixed and cured. The stabilizer (22) is, typically, comprised of portland cement. A binder (24) is also provided, typically asphalt emulsion. While the portland cement and asphalt emulsion can be added in desired quantities, it has been found that portland cement added in range of ½–10% of the final product weight and asphalt emulsion added in range of ½–10% of the final product weight provides good characteristics for the finished product. The oil/aggregate waste mix (14), binder (24), and stabilizer (22) are mixed and cured and the final product, stabilized road base (20) as determined by compressive strength testing and leachate testing results. Portland cement and asphalt emulsion are added to the waste mix (14) and mixed into the pug mill (18) or may be added separately to the pug mill (18). Optionally, treated oil and gas waste/road base component material (29) which is sometimes damp, may be coated with portland cement before it goes into the pug mill (18). The pug mill mixing (18) is a cold batch process.

More details of Applicant's oil and gas waste material treatment (28) are provided for in FIGS. 3 and 3A. It will first be noted that one of the purposes of treating oil and gas waste material (10A) may be to derive from it clean mud (23) which can be sold to oil and gas operators. Secondly, water is taken out of the oil and gas waste materials to be reinjected or otherwise disposed of Finally, the majority of the oil and gas waste material (10A), upon treatment, will result in treated oil and gas waste/road base component material (29), that is, oil and gas waste material (10A) from which at least some liquids have been removed.

Turning now to FIGS. 3 and 3A, it is seen that tank liquids (30A) and tank solids (30B) may be treated differently to achieve the removal of a liquid component and for the purposes of obtaining clean mud. Turning to FIG. 3A, it is seen that tank liquids (30A) are typically stored in tank liquid storage (11) from which they may be piped to and deposited on the top of a fine shaker (41) which will typically remove off the top thereof a damp solids component (63). However, a substantial portion of the tank liquids (30A) will work through the fine shaker (41) into a mud tank (43) typically located just below the fine shaker (41). From the mud tank, the fluid will enter a centrifuge (46) which will separate out another damp solids component (65) and send a fluid component to a 3 phase centrifuge (51). From the 3 phase centrifuge will come an additional damp solids component (67), clean mud (23) and water (25).

Turning now to the truck solids (30B), they may be stored, isolated "unmixed" (16) or in a storage pile of dried truck solids (17) (see FIG. 1) on an impervious layer. Either way, truck solids (30B) may be deposited, typically using a backhoe (or front loader) and a hopper and a conveyor belt onto a coarse shaker (45) off the top of which come particles which will be a coarse component (69). The coarse component is further treated by crushing. Much of the truck solids (30B) will, however, fall through the coarse shaker (45) and these are transported or dropped into a centrifugal drier (47). The centrifugal drier (47) will yield a treated oil and gas waste/road base component material (29C) and a liquid portion (49) which will be transported to mud tank (43) (see FIG. 3A for processing).

The coarse component (69) comes off the top of the shaker and typically includes large chucks of stone or rock which may be transported to the crusher. Occasionally, rags, wood, cans and other extraneous material may be found in this coarse component. This extraneous material may be isolated, transported and disposed of offsite in permitted landfills. It is noted that the crusher operation is typically isolated from the ground if it contains a portion of the coarse component to prevent contamination of the environment.

Thus it is seen that both tank liquids (30A) and truck solids (30B) coming from oil and gas waste material sites (32) will undergo some physical separation of some solids from liquids, the liquid portion of which will typically end up in mud tank (43). Following separation of liquids both resulting components remain isolated. The liquids in mud tank (43) will undergo a process that yields a treated oil and gas waste material/road base component material (29) and also clean mud (23) and water (25).

Novelty is achieved in taking oil and gas waste material including tank liquids and truck solids and making a road base that meets industry standards and is environmentally safe. However, treatment is done at a remote site while isolating the oil and gas waste before and during treatment From the solids a liquid is extracted by stacking, dry mixing or mechanical separation. From the tank liquids a solid portion and a clean mud portion and water is produced (see FIGS. 3 and 3A). Depending on weather, type of or source of waste material, extent of drying desired, economic consideration, environmental consideration may dictate which of the three separation types, or combination of the three types will be used.

The oil and gas waste material that is treated according to Applicant's present invention usually contains a solid phase and a liquid phase. It is Applicant's novel methods of treatment that help remove a part of the liquid phase. The following areas list of some of the oil and gas waste material that may be subject to Applicant's novel treatment and use and Applicant's novel roadbase:

Compressor stations
Drilling fluids and cuttings from onshore operations
Basic sediment and water (BS&W) and tank bottoms;
Condensate;
Deposits removed from piping and equipment prior to transportation (i.e., pipe scale hydrocarbon solids, hydrates and other deposits);
Drilling fluids and cuttings from offshore operations disposed of onshore;
Liquid and sludge;
Liquid and solid wastes generated by crude oil and tank bottom reclaimers;
Weathered oil;
Pigging wastes from producer operated gathering lines;
Pit sledges and contaminated bottoms from storage or disposal of exempt wastes;
Produced sand;
Produced water constituents removed before disposal (injection or other disposal);
Slop oil (waste crude oil from primary field operations and production);
Crude oil contaminated soil;
Work over wastes (i.e., blowdown, swabbing and bailing wastes);
Waste in transportation pipeline related pits;
Cement slurry returns from the well and cement cuttings;
Produced water contaminated soils.

Trucks solids or tank liquids or any other oil and gas waste material may be transported to Applicant's novel treatment site (21) via a boat or a barge, if the site is built next to water. If not, barges and boats that carry oil and gas waste material from offshore operations may be bring such material to a dock for offloading onto tanks or trucks for transportation to the treatment site (21). Boats typically transport oil and gas waste from an offshore drilling operations isolated and large containers. Barges typically carry the oil and gas waste material in bulk.

It is noted throughout the figures that at each point in the storage and treatment of the oil and gas waste material and the components derive from it, there is isolation, as by a man made or natural impervious layer (19). Indeed, treatment also occurs in isolation from the environment-as for example by mixing and/or curing on an imperious layer. Further, it is noted that Applicant's provide a novel treatment site (21) which itself may be surrounded by a berm (13) such an earthen berm or an impervious berm and may also include an impervious floor. The impervious floor may be natural material such as clay or packed dirt or compacted soil or may be a man made material, such a heavy plastic or concrete. The novel treatment site (21) is underlain by an impervious layer and bermed so that incoming oil and gas waste material, which often contains an environmentally unsafe compositions, will be treated and stored in isolation and will leave the treatment site in an nonhazardous and safe form-as environmentally safe roadbase, clean mud for use in further drilling operations and water, for injection offsite.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A method of preparing a composition for use as a road base comprising the steps of:

obtaining a quantity of oil and gas waste material from a first site;
obtaining a quantity of aggregate from a second site;
transporting said quantity of oil and gas waste material from said first site to a third site;
transporting said quantity of aggregate from said second site to said third site;
receiving and storing, in isolation from a ground surface at the third site, the oil and gas waste material;
separating from the oil and gas waste material, without contamination of the ground at the third site, at least one of the following: water, oil or clean mud;
forming an oil/aggregate mix by combining in isolation from the ground surface of the third site a portion of said quantity of oil and gas waste material with a portion of said quantity of aggregate in a proportion such that liquids contained in said portion of said quantity of oil and gas waste material do not saturate said portion of said quantity of aggregate said forming accomplished without contamination of the ground of the third site;

adding a binder and stabilizer to said oil/aggregate mix, said binder and stabilizer including at least one of Portland cement or asphalt emulsion;

adjusting the ratio of Portland cement to the range of ½ to 10% product weight and the range of asphalt emulsion to the range of ½ to 10% product weight; and mixing said binder and stabilizer with said oil/aggregate mix to create a quantity of said road base.

2. A composition for use as a road base including:

an oil aggregate mix including a portion of liquid oil and gas waste material and a portion of aggregate, the two portions in proportion such that the liquid contained in the oil and gas waste does not saturate the aggregate;

Portland cement; and an asphalt emulsion, wherein the Portland cement is in the range of 1 to 10% by product weight and the asphalt emulsion is in the range of ½ to 10% by product weight.

* * * * *